(12) United States Patent  
Zhao et al.

(10) Patent No.: US 11,445,047 B2  
(45) Date of Patent: Sep. 13, 2022

(54) ROHC HEADER COMPRESSION FOR MPTCP

(71) Applicant: Apple Inc., Cupertino, CA (US)

(72) Inventors: Yingjie Zhao, Pleasanton, CA (US); Jianxiong Shi, Dublin, CA (US); Lele Cui, Beijing (CN); Li Su, San Jose, CA (US); Faraz Faheem, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 784 days.

(21) Appl. No.: 16/084,658

(22) PCT Filed: Sep. 29, 2017

(86) PCT No.: PCT/CN2017/104517  
§ 371 (c)(1),  
(2) Date: Sep. 13, 2018

(87) PCT Pub. No.: WO2019/061337  
PCT Pub. Date: Apr. 4, 2019

(65) Prior Publication Data  
US 2020/0304604 A1    Sep. 24, 2020

(51) Int. Cl.  
*H04L 69/04* (2022.01)  
*H04L 69/14* (2022.01)  
(Continued)

(52) U.S. Cl.  
CPC .............. *H04L 69/04* (2013.01); *H04L 69/14* (2013.01); *H04L 69/16* (2013.01); *H04L 69/22* (2013.01);  
(Continued)

(58) Field of Classification Search  
CPC ......... H04L 69/04; H04L 69/14; H04L 69/16; H04L 69/22; H04W 28/06; H04W 80/06; H04W 88/02  
See application file for complete search history.

(56) References Cited

U.S. PATENT DOCUMENTS 6,967,964 B1    11/2005  Svanbro  
7,817,628 B2 *  10/2010  Pelletier ................. H04L 69/04  
                                                        370/389  
(Continued)

FOREIGN PATENT DOCUMENTS

CN         1595911        3/2005  
CN       101453298 A      6/2009  
(Continued)

OTHER PUBLICATIONS

Cerf, Dalal & Sunshine; "Specification of Internet Transmission Control Program"; Dec. 1974; 70 pages.  
(Continued)

*Primary Examiner* — Patrice L Winder  
*Assistant Examiner* — Angela M Widhalm De Rodrig  
(74) *Attorney, Agent, or Firm* — Kowert, Hood, Munyon, Rankin & Goetzel, P.C.

(57) ABSTRACT

Some embodiments relate to a user equipment device (UE), and associated methods for performing ROHC header compression on TCP packets with MPTCP option enabled. In some embodiments, a compressor may determine that a first portion of the stream of data packets is formatted according to the transmission control protocol (TCP) with a multipath TCP (MPTCP) option enabled. The compressor may establish context with a corresponding decompressor and may operate in one of three modes of compression based on the context. In some embodiments, when the context indicates that the corresponding decompressor supports decompression of TCP data packets with MPTCP option enabled, the  
(Continued)

compressor may operate in a first or second mode of compression. In some embodiments, when the context indicates that the corresponding decompressor does not support decompression of TCP data packets with MPTCP option enabled, the compressor may operation in a third mode of compression.

20 Claims, 11 Drawing Sheets

(51) Int. Cl.
| | | |
|---|---|---|
| *H04L 69/16* | (2022.01) | |
| *H04L 69/22* | (2022.01) | |
| *H04W 28/06* | (2009.01) | |
| *H04W 80/06* | (2009.01) | |
| *H04W 88/02* | (2009.01) | |

(52) U.S. Cl.
CPC ........... *H04W 28/06* (2013.01); *H04W 80/06* (2013.01); *H04W 88/02* (2013.01)

(56) References Cited

U.S. PATENT DOCUMENTS

| | | | |
|---|---|---|---|
| 9,426,693 B2 | 8/2016 | Wu | |
| 9,867,096 B2 | 1/2018 | Susitaival | |
| 9,948,725 B2 | 4/2018 | Biswas | |
| 10,484,083 B1* | 11/2019 | Niraula | H04L 69/04 |
| 10,523,790 B2* | 12/2019 | Callard | H04L 69/04 |
| 2014/0351447 A1* | 11/2014 | Annamalaisami | H04L 69/163 |
| | | | 709/227 |
| 2015/0124699 A1* | 5/2015 | Chebolu | H04L 69/22 |
| | | | 370/328 |
| 2015/0131535 A1* | 5/2015 | Wallentin | H04W 76/15 |
| | | | 370/329 |
| 2015/0156653 A1* | 6/2015 | Persson | H04L 67/04 |
| | | | 370/252 |
| 2015/0358945 A1* | 12/2015 | Susitaival | H04W 48/16 |
| | | | 370/329 |
| 2016/0242180 A1* | 8/2016 | Richards | H04W 76/15 |
| 2016/0295613 A1* | 10/2016 | Wager | H04W 72/042 |
| 2016/0309389 A1* | 10/2016 | Laraqui | H04W 76/12 |
| 2017/0006139 A1* | 1/2017 | Kwon | H04W 28/065 |

FOREIGN PATENT DOCUMENTS

| | | |
|---|---|---|
| CN | 103067971 A | 4/2013 |
| CN | 105765929 | 7/2016 |

OTHER PUBLICATIONS

Information Sciences Institute, University of Southern California; "Transmission Control: ROTOCO: DARPA Internet Program Protocol Specification"; Sep. 1981; 90 pages.
Internet Engineering Task Force; "Requirements for Internet Hosts—Communication Layers"; Oct. 1989; 116 pages.
Bormann, et al.; "RObust Header Compression (ROHC): Framework and four profiles: RTP, UDP, ESP, and uncompressed"; Jul. 2001; 168 pages.
Jonsson; "RObust Header Compression (ROHC): Terminology and Channel Mapping Examples"; Apr. 2004; 20 pages.
Jonsson, et al.; "RObust Header Compression (ROHC): Corrections and Clarifications to RFC 3095"; Feb. 2007; 33 pages.
Pelletier, et al.; "RObust Header Compression (ROHC): A Profile for TCP/IP (ROHC-TCP)"; Jul. 2007; 94 pages.
Finking & Pelletier; "Formal Notation for RObust Header Compression (ROHC-FN)"; Jul. 2007; 63 pages.
Pelletier & Sandlund; "NPL10RObust Header Compression Version 2 (ROHCv2): Profiles for RTP, UDP, IP, ESP and UDP-Lite"; Apr. 2008; 124 pages.
Sandlund, et al.; "The RObust Header Compression (ROHC) Framework"; Mar. 2010; 41 pages.
Ford, et al.; "TCP Extensions for Multipath Operation with Multiple Addresses"; Jan. 2013; 64 pages.
Pelletier, et al.; "RObust Header Compression (ROHC): A Profile for TCP/IP (ROHC-TCP)"; Jan. 2013; 96 pages.
Duke, et al.; "A Roadmap for Transmission Control Protocol (TCP) Specification Documents"; Feb. 2015; 57 pages.
EFFNET AB; "The concept of robust header compression, ROHC" white paper; Feb. 2004; 16 pages.
International Search Report, Application No. PCT/CN2017/104517, dated Jun. 14, 2018, 4 pages.
First Office Action for CN Patent Application No. 201780095383.7, dated Aug. 30, 2021, 6 pages.

* cited by examiner

- IPv4 Identification          (16 bits) - IP-ID
- TCP Sequence Number          (32 bits) - SN
- TCP Acknowledgment Number    (32 bits)
- TCP Reserved                 ( 4 bits)
- TCP ECN flags                ( 2 bits) - ECN
- TCP Window                   (16 bits)
- TCP Options
  o Maximum Segment Size       (32 bits) - MSS
  o Window Scale               (24 bits) - WSCALE
  o SACK Permitted             (16 bits)
  o TPC SACK                   (80, 144, 208, or 272 bits) - SACK
  o TCP Timestamp              (80 bits) - TS

```
                    1                   2                   3
0 1 2 3 4 5 6 7 8 9 0 1 2 3 4 5 6 7 8 9 0 1 2 3 4 5 6 7 8 9 0 1
+---------------+---------------+-------+-----------------------+
|     Kind      |    Length     |Subtype|                       |
+---------------+---------------+-------+                       |
|                   Subtype-specific data                       |
|                      (variable length)                        |
+---------------------------------------------------------------+
```

FIG. 12

(Prior Art)

| Value | Name |
|---|---|
| 0x0 | Multipath Capable |
| 0x1 | Join Connection |
| 0x2 | Data Sequence Signal |
| 0x3 | Add Address |
| 0x4 | Remove Address |
| 0x5 | Change Subflow Priority |
| 0x6 | Fallback |
| 0x7 | Fast close |
| 0x8-0xe | unassigned |
| 0xf | private |

FIG. 13

(Prior Art)

| Option name | Table index |
|---|---|
| NOP | 0 |
| EOL | 1 |
| MSS | 2 |
| WINDOW SCALE | 3 |
| TIMESTAMP | 4 |
| SACK-PERMITTED | 5 |
| SACK | 6 |
| MPTCP | 7 |
| Generic options | 8-15 |

ROHC HEADER COMPRESSION FOR MPTCP

FIELD

The present application relates to wireless communication, including providing techniques for ROHC header compression for MPTCP packets.

DESCRIPTION OF THE RELATED ART

Wireless communication systems are rapidly growing in usage. Further, wireless communication technology has evolved from voice-only communications to also include the transmission of data, such as Internet and multimedia content.

ROHC (RObust Header Compression) is a standardized (see, e.g., Internet Engineering Task Force (IETF) Request for Comments (RFC) 3095, IETF RFC 3759, IETF RFC 4815, IETF RFC 5225, and IETF RFC 6846) method to compress headers of various types of Internet packets, such as UPD (user datagram protocol), RTP (real-time transport protocol), and TCP (transmission control protocol), among other packet types. In typical streaming applications, headers range from 40 bytes for IPv4 (Internet Protocol version 4) to 60 bytes for IPv6. ROHC compresses headers from the 40 to 60 bytes to 1 or 3 byte headers via a compressor prior to a link. A decompressor after the link de-compresses the headers.

MPTCP is a transport layer protocol built on top of traditional TCP to provide a transport layer on which applications can send/receive data over multiple paths (see, e.g., IETF RFC 6824). For example, multipath TCP may be used to aggregate TCP connections or subflows created over multiple networks on a multihomed device into one single pipe or trunk for sending/receiving data. IETF RFC 6846 standardizes ROHC for TCP packets and has been implemented for use with MPTCP packets as well.

In many instances, however, ROHC of MPTCP packets has resulted in transmission failures due, in part, to the format of the MPTCP packets. Thus, improvements in the field are desirable.

SUMMARY

Embodiments are presented herein of, inter alia, a user equipment device (UE), and associated methods for performing ROHC header compression on TCP packets with MPTCP option enabled.

In some embodiments, a compressor (e.g., one or more processors or processing circuitry) included in a UE may determine, based (at least in part) on first information included in headers of a stream of data packets, that a first portion of the stream of data packets is formatted according to the transmission control protocol (TCP) with a multipath TCP (MPTCP) option enabled. The compressor may establish context with a corresponding decompressor and may operate in one of three modes of compression based on the context. In some embodiments, when the context indicates that the corresponding decompressor supports decompression of TCP data packets with MPTCP option enabled, the compressor may operate in a first or second mode of compression. In some embodiments, when the context indicates that the corresponding decompressor does not support decompression of TCP data packets with MPTCP option enabled, the compressor may operation in a third mode of compression. The compressor may then generate a chain of compressed data packets and transmit the chain of compressed data packets to the corresponding decompressor.

In some embodiments, the first mode of compression (e.g., a safe compression mode) may include transmitting the first portion of the stream of data packets with the MPTCP option enabled with partial ROHC and transmitting a second portion of the stream of data packets with the MPTCP option not enabled with ROHC. In some embodiments, partial ROHC may include performing ROHC on a data packet excluding the MPTCP option and transmitting the MPTCP option as part of a compressed list. In some embodiments, the second mode of compression (e.g. a full compression mode) may include transmitting the first portion of the stream of data packets with the MPTCP option enabled with ROHC and transmitting the second portion of the stream of data packets with the MPTCP option not enabled with ROHC. In some embodiments, the third mode of compression (e.g., non-compression mode) may include transmitting the first portion of the stream of data packets with the MPTCP option enabled without compression and transmitting the second portion of the stream of data packets with the MPTCP option not enabled with ROHC.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 12 illustrates an MPTTCP option Format of a TCP header, according to IETF RFC 6824.

FIG. 13 illustrates MPTCP subtypes, according to IETF RRFC 6824.

Figure 1:
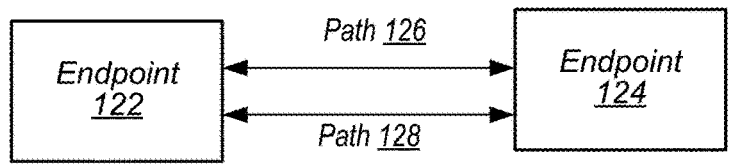
FIGS. 1-2 illustrate example wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium a memory medium as described above, as well as a physical transmission medium, such as a bus, network, and/or other physical transmission medium that conveys signals such as electrical, electromagnetic, or digital signals.

Programmable Hardware Element includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device") any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB" or "gNB") has the full breadth of its ordinary meaning, and at least includes a wireless communication station installed at a fixed location and used to communicate as part of a wireless cellular communication system.

TCP—refers to transmission control protocol for transmission of internet packets and has the full breadth of its ordinary meaning. TCP is standardized at least by LEFT RFCs 675, 793, 1122, and 7414.

MPTCP—refers to multipath TCP, a transport layer protocol built on top of traditional TCP to provide a transport layer on which applications can send/receive data over multiple paths (see, e.g., IETF RFC 6824). MPTCP has the full bread of its ordinary meaning. MPTCP is standardized at least by LEFT RCF 6824.

ROHC—refers to RObust Header Compression and has the full breadth of its ordinary meaning. ROHC is standardized at least by IETF RFCs 3095, 3759, 4815, 4996, 4997, 5225, 5795, and 6846.

WI-FI—The term "WI-FI" or Wi-Fi has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
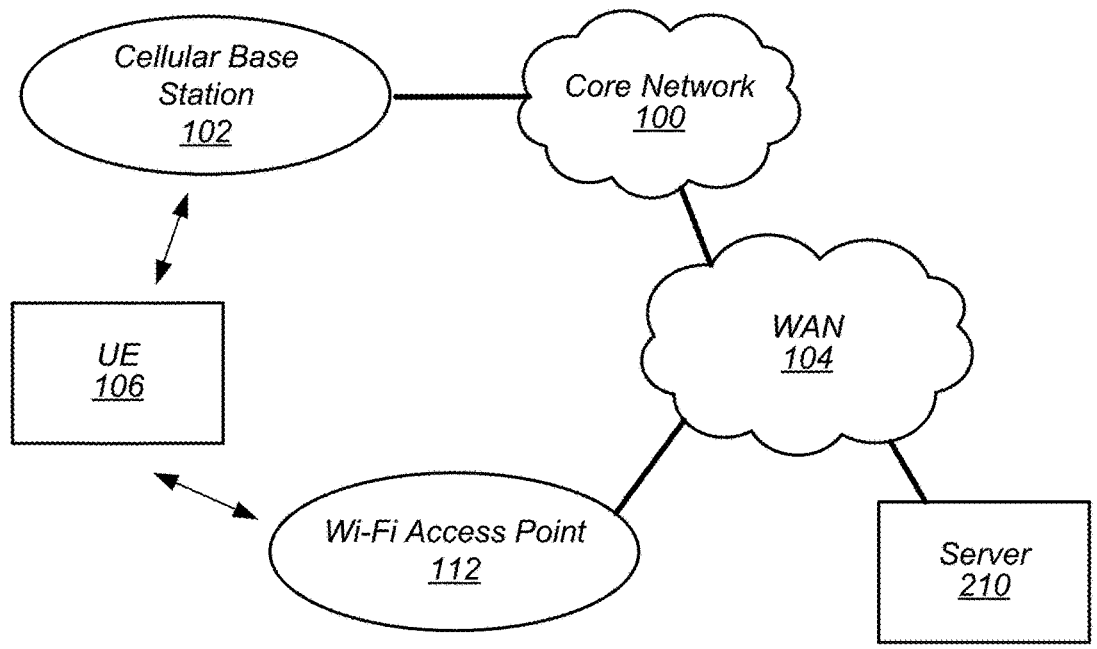
Figure 3:
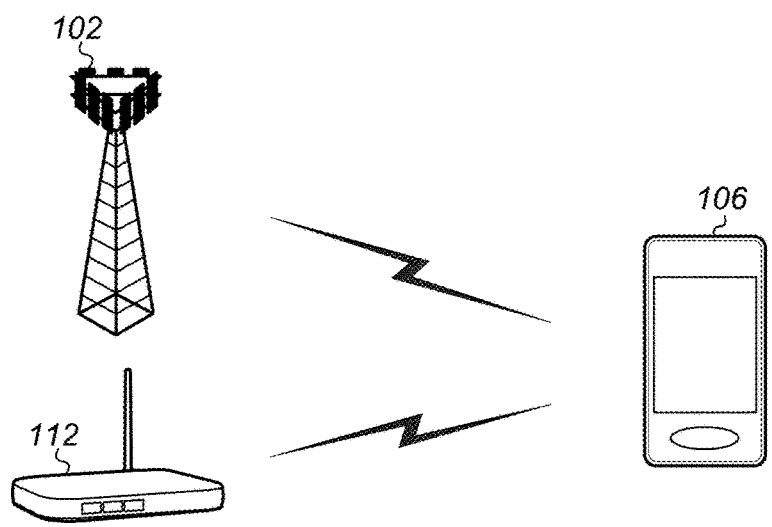
FIG. 3 illustrates a cellular base station (eNB/gNB) and a Wi-Fi (or WLAN) access point (AP) in communication with a wireless user equipment device (UE), according to some embodiments.

FIGS. 1-3—Wireless Communication Systems

FIGS. 1-2 illustrate exemplary (and simplified) communication systems. It is noted that the systems of FIGS. 1-2 are merely examples of possible systems, and embodiments may be implemented in any of various systems, as desired.

The exemplary wireless communication system illustrated in FIG. 1 includes two endpoints having multiple communication paths between them. Thus, endpoint 122 may be capable of communicating with endpoint 124 via path 126 or path 128.

Each of endpoint 122 and endpoint 124 may be a 'fixed' or 'mobile' endpoint. A fixed endpoint may be an endpoint which is substantially stationary and/or which communicates by way of one or more wired communication techniques. Some examples might include a server computer providing cloud-based services via the Internet, a bridge, a load balancer, a personal desktop computer or workstation, a set top box, a television, etc. A mobile endpoint may be an endpoint which is substantially mobile and/or which communicates by way of one or more wireless communication techniques. Some examples might include a user equipment device (UE) (e.g., such as mobile telephone smart phone, or tablet computer), portable gaming device, portable media player, and so forth. Note that hybrid endpoints which share traits of both fixed and mobile endpoints are also possible. For example, many laptop computers may be capable of performing both wireless (e.g., Wi-Fi/BLUETOOTH) and wired (e.g., Ethernet) communication, and additionally may be capable of substantial movement (e.g., when operating from battery reserve power) or may be substantially stationary (e.g., when docked and/or connected to a wall outlet for power) at various times.

One or both of endpoints 122, 124 may be multihomed. For example, one or both of endpoint 122, 124 may be capable of communicating via multiple network interfaces. As such, there may be multiple possible communication paths 126, 128 between endpoints 122, 124. Although two paths (e.g., path 126 and path 128) are illustrated in FIG. 1, it should be noted that any number of paths may exist between endpoints. For example, if each of endpoints 122, 124 is capable of communicating via two different network interfaces, there might be four possible communication paths between the endpoints 122, 124. Other numbers of different network interfaces and possible communication paths are also possible.

The multiple communication paths 126, 128 may be used to establish a multipath transmission control protocol (MPTCP) session or connection between endpoints 122 and 124. The MPTCP session may be established according to and/or include any of various features described in the MPTCP specification IETF RFC 6824. For example, one subflow of the MPTCP connection may be established over path 126, while another subflow of the MPTCP connection may be established over path 128. Such an MPTCP connection may be established and configured/controlled according to various aspects of the present disclosure.

The exemplary wireless communication system illustrated in FIG. 2 represents one possible communication system having the characteristics of the exemplary communication system illustrated in FIG. 1. In particular, a first endpoint (e.g., a wireless user equipment device (UE) 106) may be capable of communicating with another endpoint (e.g., server 210) using either of a first communication path (e.g., via cellular base station 102, core network 100, and wide area network 104) or a second communication path (e.g., via Wi-Fi access point 112 and wide area network 104).

As shown, the UE 106 may communicate with a Wi-Fi access point (AP) 112 and with a cellular base station 102. The AP 112 may be an access point providing a wireless local area network (WLAN). The AP 112 may be equipped to communicate with a wide area network (WAN) 104, such as the Internet. Thus, the AP 112 may facilitate communication between the UE 106 and the WAN 104. The AP 112 and the UE 106 may be configured to communicate over the transmission medium using Wi-Fi, including any of various versions of IEEE 802.11 (e.g., a, b, g, n, ac, ad, and/or ax) or LTE in an unlicensed band (LAA). Note that the AP 112 may also facilitate communication between the UE and other computing devices which also participate in the WLAN directly.

The base station 102 may be a base transceiver station (BTS) or cell site (a "cellular base station"), and may include hardware that enables wireless communication with cellular devices (such as UE 106) according to one or more cellular communication protocols. The communication area (or coverage area) of the base station 102 may be referred to as a "cell." The base station 102 and the UE 106 may be configured to communicate over the transmission medium using any of various radio access technologies (RATs) or wireless communication technologies, such as GSM, UMTS (WCDMA, TDS-CDMA), LTE, LTE-Advanced (LTE-A), 5G-NR, HSPA, 3GPP2 CDMA2000 (e.g., 1×RTT, 1×EV-DO, HRPD, eHRPD), Wi-Fi, WiMAX etc. One example of LTE or LTE-A communications may be VoLTE (Voice over LTE).

As shown, the cellular base station may be equipped to communicate with a core network 100 of a cellular service provider. Thus, the base station 102 may facilitate communication between the UE 106 and the core network 100. The core network 100 may in turn be equipped to communicate with WAN 1040 (e.g., the Internet, or another wide area network). Note that the core network 100 may also or alternatively be equipped to communicate with one or more other networks (e.g., a telecommunication network such as a public switched telephone network (PSTN), one or more core networks of other cellular service providers, etc.). The cellular base station 102 may thus provide the UE 106 (and potentially numerous other UEs) with various telecommunication capabilities, such as voice, text messaging, e.g., SMS (Short Message Service) and similar text messaging technologies, such as iMessage, Facebook Messenger, Whatsapp, etc., and/or data services.

Thus, UE 106 may be capable of communicating using multiple wireless communication standards, including at least one wireless networking protocol (e.g., Wi-Fi) and at least one cellular communication protocol (e.g., GSM, UMTS (WCDMA), LTE, LTE-Advanced (LTE-A), 5G-NR, 3GPP2 CDMA2000 (e.g., 1×RTT, 1×EV-DO, HRPD, eHRPD), etc.). Note additionally that the UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol (e.g., BLUETOOTH, NAN, Wi-Fi Direct, and so forth), if desired. In addition, or as an alternative, the UE 106 may be capable of communicating using one or more wired communication standards. For example, the UE 106 may be capable of communicating with one or more wired access points, e.g., via Ethernet. It may, for example, be possible for the UE 106 to couple via wired means to the Wi-Fi access point 112 in addition to or as an alternative to utilizing Wi-Fi communication. Other combinations of wireless and wired communication standards (including more than two wireless and/or wired communication standards) are also possible.

The server 210 may also be equipped to communicate with WAN 104. The server 210 may provide access to a cluster or server farm configured to provide one or more cloud-based services via the Internet. For example, the server 210 may further be equipped to communicate with service centers which may each include one or more computing devices (e.g., servers) configured to provide cloud-based services. Each service center might, for example, be configured to provide service with respect to a particular application, such as a mapping application, an intelligent personal assistant application, an e-commerce application, a media streaming application, a gaming application, etc. It should be noted that while server 210 is shown in FIG. 2 as one possible exemplary access port (and potential MPTCP endpoint), any of various devices may be used (alternatively or in combination with server 210) as intermediary/access port devices/entities to service centers if desired, such as gateways, routers, firewalls, and/or any of various other "middleboxes". In addition, it should be noted that while not explicitly shown, the server 210 may include any number of network interfaces for connecting to the WAN 104, including one or more wired network interfaces and/or one or more wireless network interfaces.

FIG. 3 illustrates the UE 106 in communication with the cellular base station 102 and the Wi-Fi access point 112. The UE 106 may be a device with multiple wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using at least one cellular communication protocol (such as CDMA2000, LTE, LTE-A, 5G-NR, etc.) and Wi-Fi. Other combinations of wireless and/or wired communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1×RTT/1×EV-DO/HRPD/eHRPD) or LTE/LTE-A using partially or entirely shared wireless communication circuitry (e.g., using a shared radio or at least shared radio components). As another example, the UE 106 might be configured to communicate using either of LTE/LTE-A or 5G-NR using partially or entirely shared wireless communication circuitry (e.g., using a shared radio or at least shared radio components). The shared communication circuitry may couple to a single antenna, or to multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios or radio components which are shared between multiple wireless communication protocols, and one or more radios or radio components which are used exclusively by a single wireless communication protocol. For example, the UE 106 might include a shared radio for communicating using either of LTE/LTE-A or CDMA2000 1×RTT (or either of LTE or GSM), and separate radios for communicating using each of Wi-Fi and BLUETOOTH. As another example, the UE 106 might include a shared radio for communicating using either of 5G-NR or LTE/LTE-A, and separate radios for communicating using each of Wi-Fi and/or BLUETOOTH. Other configurations are also possible.

Figure 4:
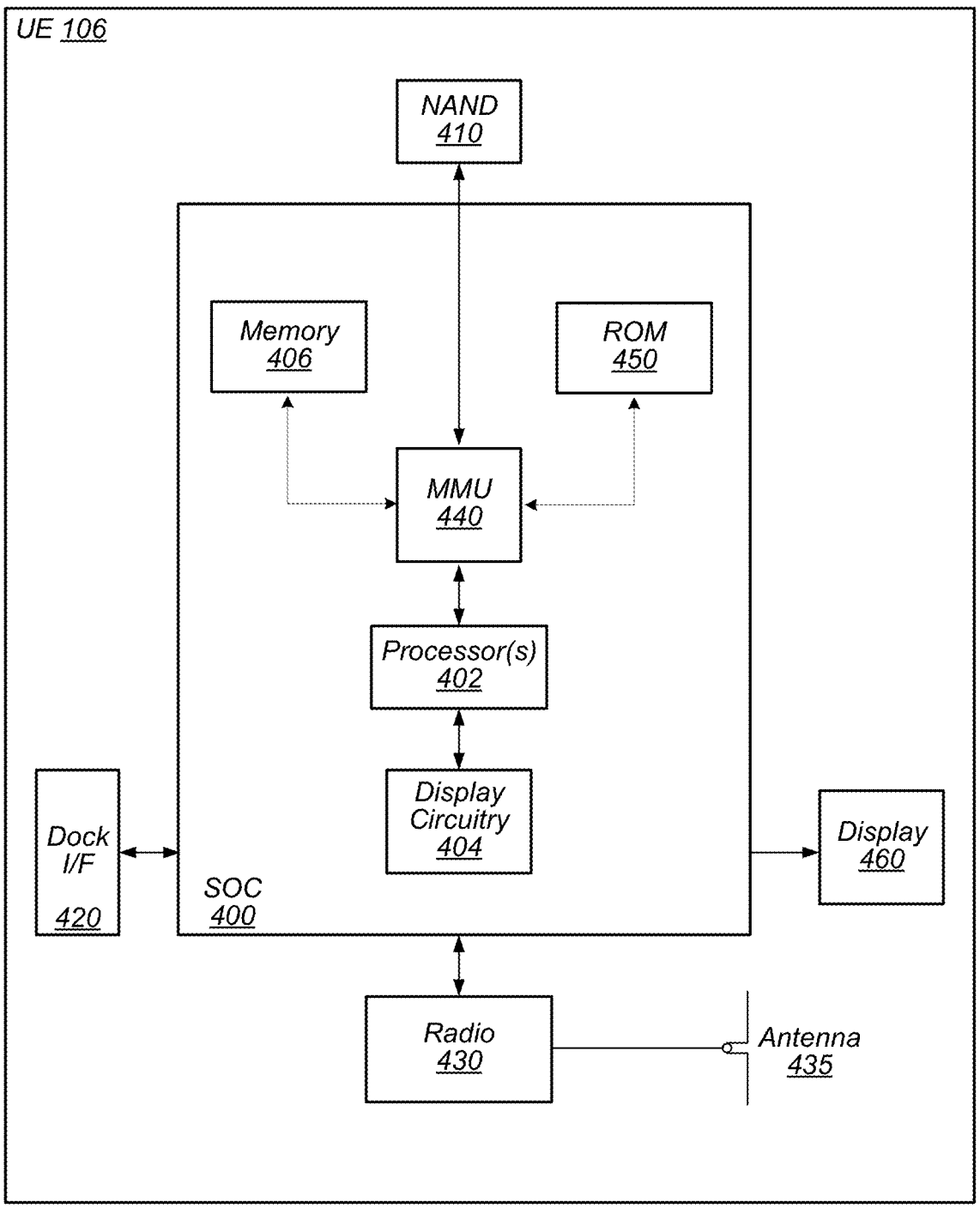
FIG. 4 is a block diagram illustrating an example UE, according to some embodiments.

FIG. 4—Example Block Diagram of a UE

FIG. 4 illustrates one possible block diagram of a user equipment device (UE) 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The UE 106 may also include other circuits or devices, such as the display circuitry 304, radio 330, connector I/F 320, and/or display 360.

In the embodiment shown, ROM 350 may include a bootloader, which may be executed by the processor(s) 302 during bootup or initialization. As also shown, the SOC 300 may be coupled to various other circuits of the UE 106. For example, the UE 106 may include various types of memory, a connector interface 320 (e.g., for coupling to a computer system), the display 360, and wireless communication circuitry (e.g., for communication using 5G-NR, LTE, CDMA2000, BLUETOOTH, Wi-Fi, NFC, GPS, etc.).

The UE 106 may include at least one antenna, and in some embodiments multiple antennas, for performing wireless communication with base stations and/or other devices. For example, the UE 106 may use antenna 335 to perform the wireless communication. As noted above, the UE 106 may in some embodiments be configured to communicate wirelessly using a plurality of wireless communication standards or radio access technologies (RATs).

As described herein, the UE 106 may include hardware and software components for implementing methods according to embodiments of this disclosure. The processor 302 of the UE 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 5:
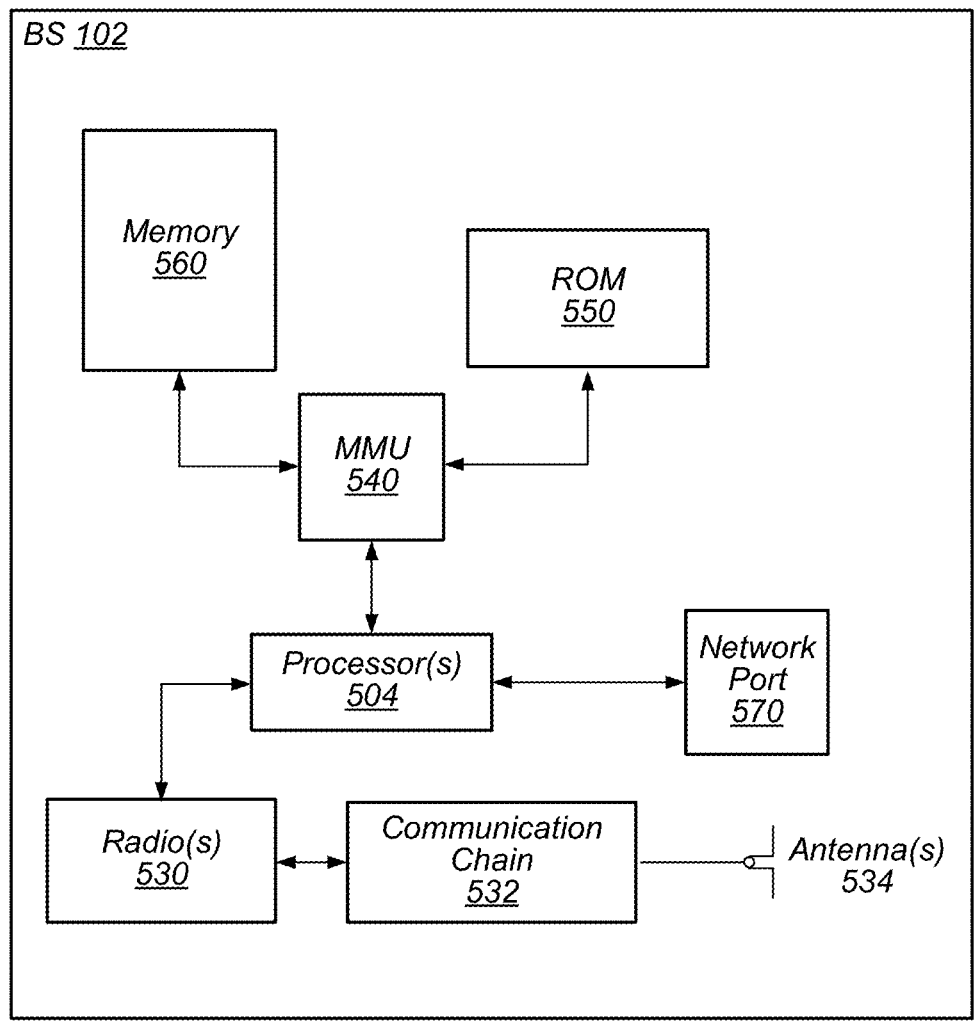
FIG. 5 illustrates an exemplary block diagram of a base station, according to some embodiments.

FIG. 5—Exemplary Block Diagram of a Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UEs 106, access to the telephone network.

The network port 570 (or an additional network port) may also or alternatively be configured to couple to a cellular network, e.g., a core network of a cellular service provider. The core network may provide mobility related services and/or other services to a plurality of devices, such as UEs 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UEs 106 via radio 530. The antenna 534 communicates with the radio 530 via communication chain 532. Communication chain 532 may be a receive chain, a transmit chain or both. The radio 530 may be configured to communicate via various wireless telecommunication standards, including, but not limited to, 5G-NR, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein.

Figure 6:
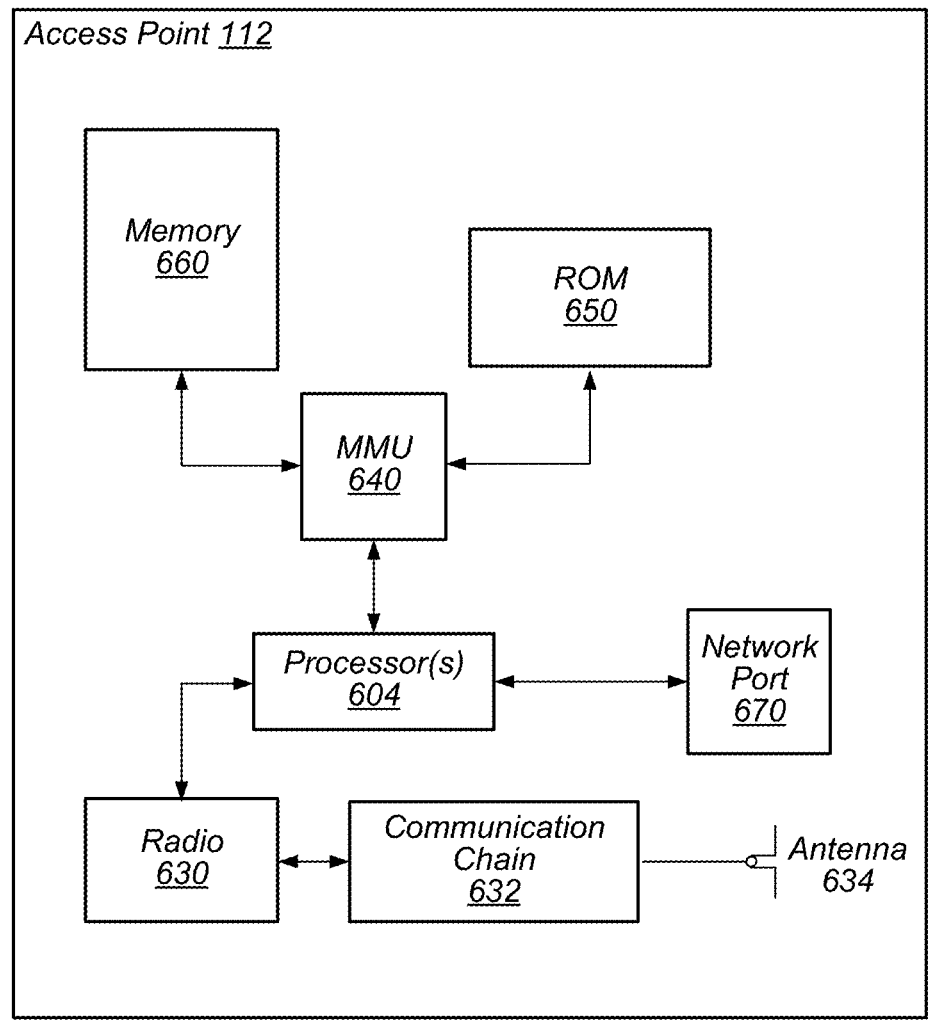
FIG. 6 illustrates an example simplified block diagram of a WLAN Access Point (AP), according to some embodiments.

FIG. 6—Access Point Block Diagram

FIG. 6 illustrates an exemplary block diagram of an access point (AP) 112. It is noted that the block diagram of the AP of FIG. 6 is only one example of a possible system. As shown, the AP 112 may include processor(s) 604 which may execute program instructions for the AP 112. The processor(s) 604 may also be coupled (directly or indirectly) to memory management unit (MMU) 640, which may be configured to receive addresses from the processor(s) 604 and to translate those addresses to locations in memory (e.g., memory 660 and read only memory (ROM) 650) or to other circuits or devices.

The AP 112 may include at least one network port 670. The network port 670 may be configured to couple to a wired network and provide a plurality of devices, such as UEs 106, access to the Internet. For example, the network port 670 (or an additional network port) may be configured to couple to a local network, such as a home network or an enterprise network. For example, port 670 may be an Ethernet port. The local network may provide connectivity to additional networks, such as the Internet.

The AP 112 may include at least one antenna 634, which may be configured to operate as a wireless transceiver and may be further configured to communicate with mobile device 106 via wireless communication circuitry 630. The antenna 634 communicates with the wireless communication circuitry 630 via communication chain 632. Communication chain 632 may include one or more receive chains, one or more transmit chains or both. The wireless communication circuitry 630 may be configured to communicate via Wi-Fi or WLAN, e.g., 802.11. The wireless communication circuitry 630 may also, or alternatively, be configured to communicate via various other wireless communication technologies, including, but not limited to, Long-Term Evolution (LTE), LTE Advanced (LTE-A), LLA, 5G-NR, Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

The AP 112 may include hardware and software components for implementing or supporting implementation of features described herein.

ROHC Compression for MPTCP Packets

Figure 7A:
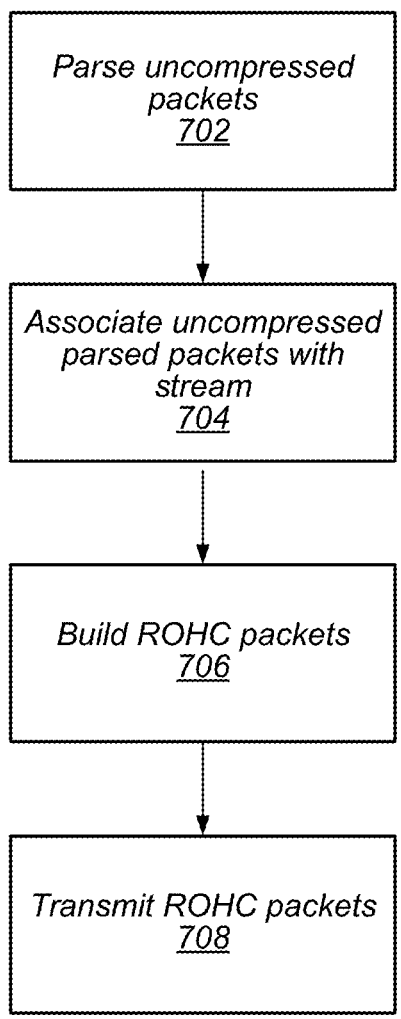
FIG. 7A illustrates an example of a technique to compress IP packets according to ROHC.
Figure 7B:
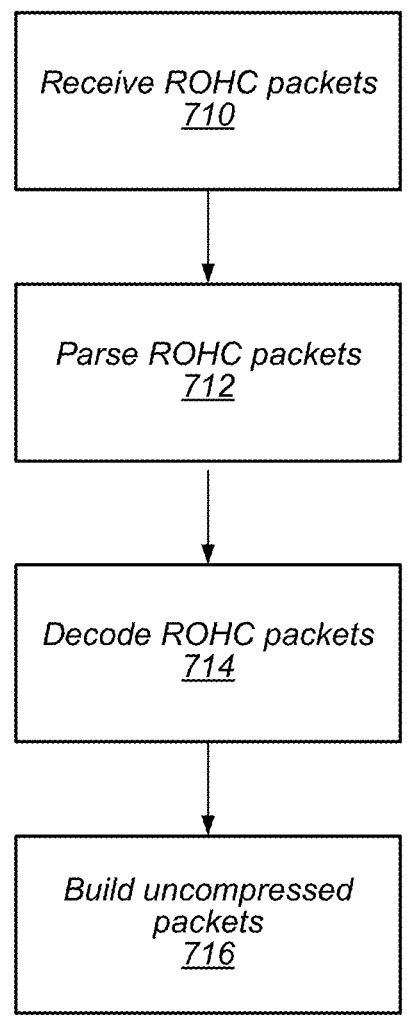
FIG. 7B illustrates an example of a technique to decompress IP packets according to ROHC.

In existing implementations, RObust Header Compression (ROHC) protocol is used to reduce bandwidth usage on network links with limited capacity and/or higher costs, e.g., such as mobile networks. Thus, ROHC defines a lossless compression schedule for network headers. The ROHC protocol is able to compress various Internet packets such as IPV4, IPv6, and TCP packets. Note that the ROHC protocol only compresses network headers and takes advantage of information redundancy in the network headers. As illustrated by FIG. 7A, at 702, ROHC compressor may parse uncompressed packets and, at 704, the ROHC compressor may associate the parsed uncompressed packets with a stream or chain (e.g., packets with inter-packet redundancy). At 706, the ROHC compressor may build corresponding ROHC packets (e.g., by appending non-redundant (or irregular) items as they appear in the uncompressed packets) and, at 708, the ROHC compressor may transmit the corresponding ROHC packets to an associated ROHC decompressor. As illustrated by FIG. 7B, a ROHC decompressor may receive ROHC packets at 710, and, at 712, the ROHC decompressor may parse the ROHC packets. At 714, the ROHC decompressor may decode packet fields of the ROHC packets according to the ROHC protocol and, at 716, the ROHC may build uncompressed packets based on the decoded packet fields.

Figure 8A:
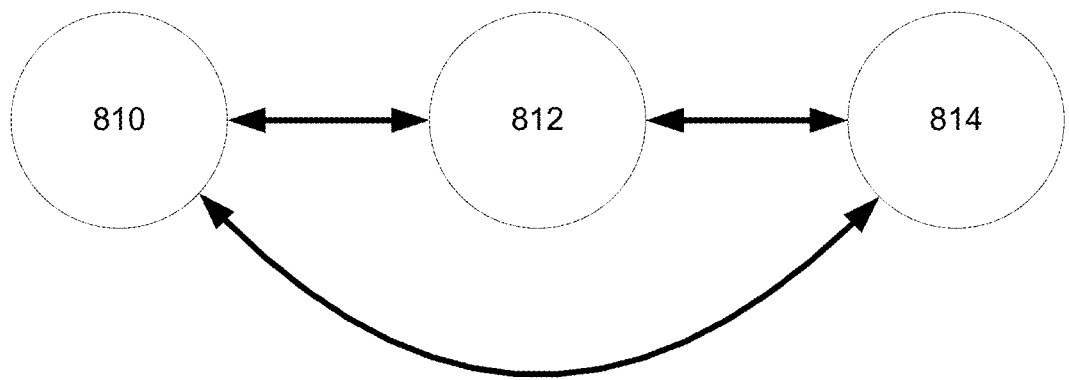
FIG. 8A illustrates an example of an ROHC compressor state machine.

As illustrated by FIG. 8A, a ROHC compressor may operate in one of three states. As shown, at 810, a ROHC compressor may operate in an initialization and refresh state. Once context has been established with an ROHC decompressor, the ROHC compressor may transition to either of states 812 or 814. State 812 represents a first order state and state 814 represents a second order state. As the ROHC compressor becomes more confident with the context of the ROHC decompressor, the ROHC compressor may transition from state 812 to 814, representing an increase of compression of packet headers. In contrast, as the ROHC compressor becomes less confident with the context of the ROHC decompressor (e.g., via feedback packets indicating error conditions at the ROHC decompressor), the ROHC compressor may transition from state 814 to either of states 812 or 810 (and similarly from state 812 to state 810). In addition, in some instances, the ROHC compressor may periodically transition from a higher state (e.g., states 814, 812) to a lower state (e.g., states 812, 810) to ensure context validity at the ROHC decompressor.

Figure 8B:
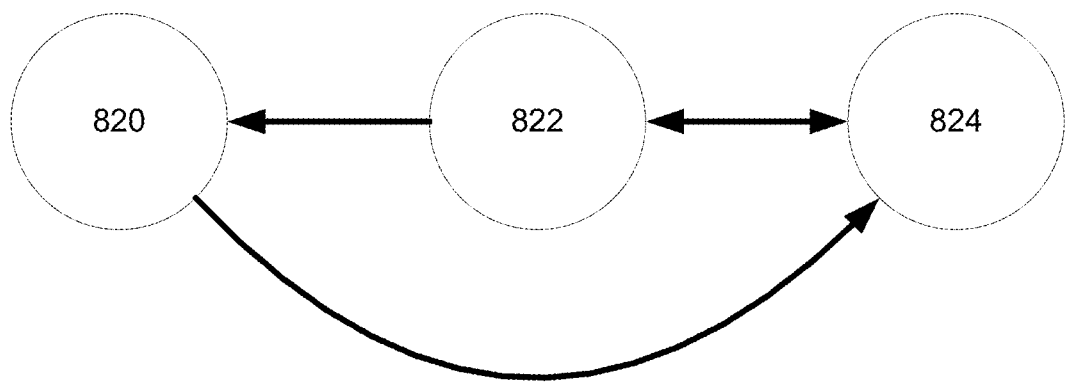
FIG. 8B illustrates an example of an ROHC decompressor state machine.

Similarly, as illustrated by FIG. 8B, a ROHC decompressor may also operate in one of three states. As shown, at 820, a ROHC decompressor may initially operate in a no context state. Once the ROHC decompressor has received and successfully decompressed an initialization and refresh packet (e.g., as produced by a ROHC compressor operating in state 810) that contains both static and dynamic information, the decompressor can generate context information and transition to a full context state at 824. The ROHC decompressor may then transition to a lower state (e.g., states 822, 820) upon an error condition. Note that when transitioning to a lower state from state 824, the ROHC decompressor may first transition to state 822 (e.g., a static context state) and attempt to recover and transition back to state 824. However, if the error condition persists, the ROHC decompressor may transition back to no context state 820, resulting in the ROHC compressor to transition back to state 810.

Figure 9A:
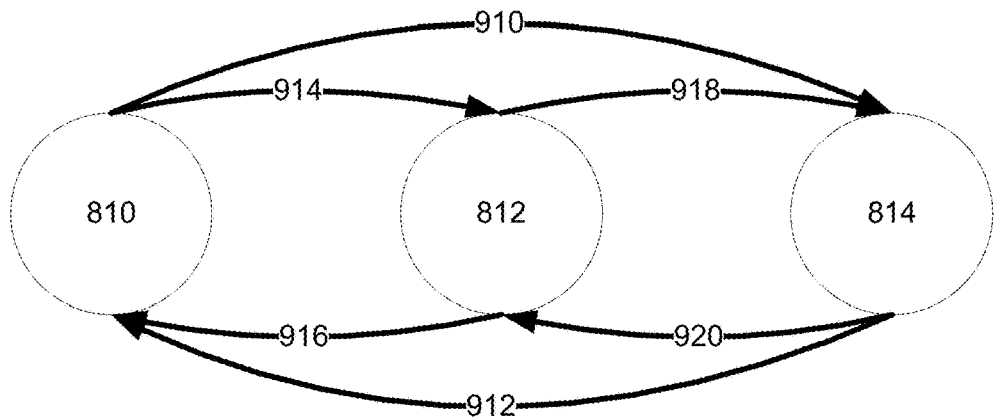
FIG. 9A illustrates an example of operation of an ROHC compressor state machine for a unidirectional mode of operation.
Figure 9B:
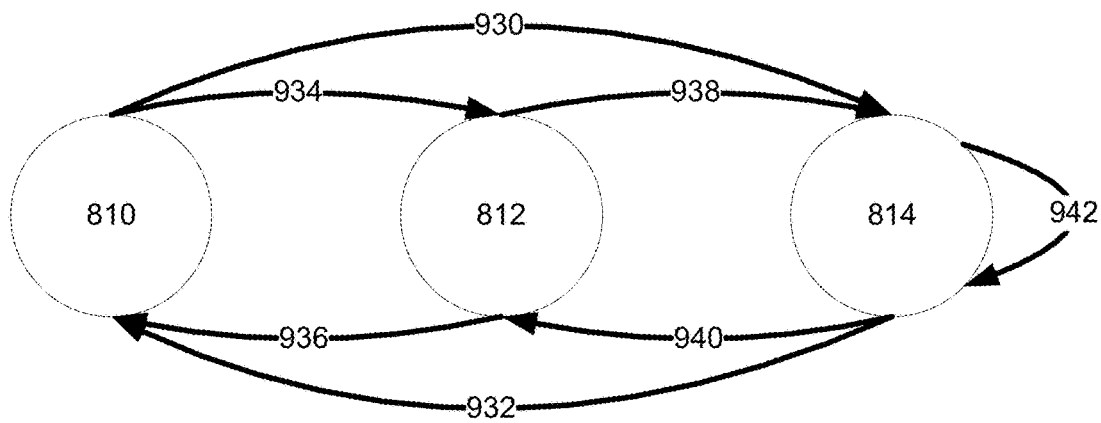
FIG. 9B illustrates an example of operation of an ROHC compressor state machine for a bi-directional optimistic mode of operation.
Figure 9C:
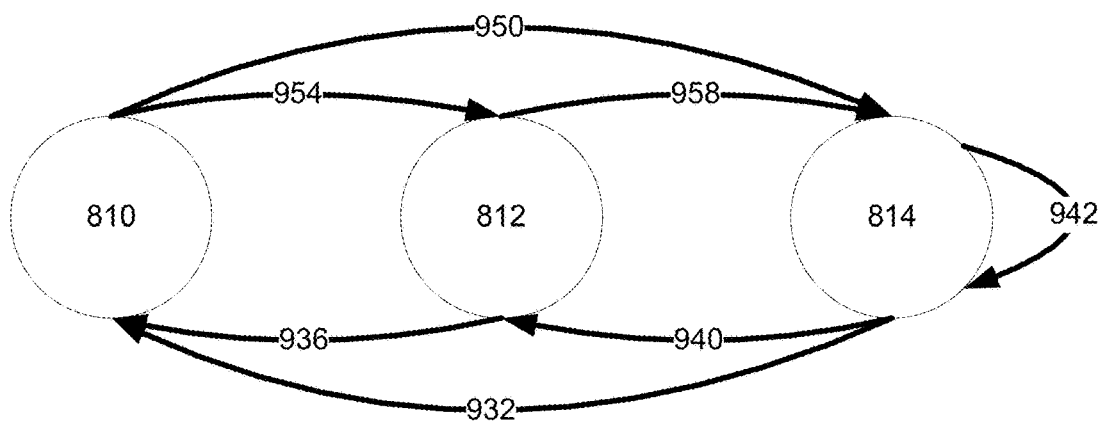
FIG. 9C illustrates an example of operation of an ROHC compressor state machine for a bi-directional reliable mode of operation.

Further, the ROHC protocol defines three modes of operation and selection of a mode of operation may be based on one or more parameters, including availability of feedback channel(s), error probabilities, and/or header size variations. FIG. 9A illustrates a unidirectional mode of operation of a ROHC compressor, FIG. 9B illustrates a bi-directional optimistic mode of operation of a ROHC compressor, and FIG. 9C illustrates a bi-directional reliable mode of operation of a ROHC compressor. As shown in FIG. 9A, the ROHC compressor starts at state 810 and transmits multiple initialization and refresh (IR) packets to the ROHC decompressor and then transitions (e.g., at 910) to state 814. Note that for a unidirectional mode of operation of the ROHC compressor, packets are sent in one direction, from the ROHC compressor to the ROHC decompressor. Once in state 814, a timeout/update mechanism may be enabled to periodically transition (e.g., at 920) the ROHC compressor from state 814 to state 812. In addition, while in state 814, a timeout mechanism may be enabled to transition (e.g., at 912), the ROHC compressor back to state 810, e.g., as necessary. Once in state 812, another timeout mechanism may be enabled to transition (e.g., at 916) from state 812 to state 810, e.g., as necessary. In addition, if the state machine does not time out in state 812, the ROHC compressor may return (e.g., at 918) to state 814. Further, if the state machine does return to state 810, the state machine may optionally transition back to either state 812 (e.g., at 914) or state 814 (e.g., at 910). Note that if the ROHC compressor receives feedback from the ROHC decompressor, the ROHC compressor may determine to transition to either bi-directional modes of operation.

Thus, as shown in FIG. 9B, once context of the ROHC decompressor has been established, the ROHC compressor can transition (e.g., at 930) from state 810 to state 814. Once at state 814, if the ROHC compressor receives acknowledgments (ACKs) from the ROHC decompressor (e.g., at 942), the ROHC compressor may remain in state 814. However, if the ROHC compressor receives a negative ACK (NACK) or a request for update of context, the ROHC compressor may transition (e.g., at 940) to state 812. In addition, while in state 814, if the ROHC compressor receives a static NACK, the ROHC compressor may transition (e.g., at 932) back to state 810. Once in state 812, if the ROHC compressor receives an ACK, it may transition (e.g., at 938) back to state 814. Conversely, if the ROHC compressor receives a NACK or a static NACK, it may transition (e.g., at 936) to state 810. Once in state 810, the ROHC compressor may optionally transition back to either state 812 (e.g., at 934) or state 814 (e.g., at 930).

Turning to FIG. 9C, in the bi-directional reliable mode, once context of the ROHC decompressor has been established and an ACK received from the ROHC decompressor, the ROHC compressor can transition (e.g., at 950) from state 810 to state 814. Once at state 814, if the ROHC compressor receives acknowledgments (ACKs) from the ROHC decompressor (e.g., at 942), the ROHC compressor may remain in state 814. However, if the ROHC compressor receives a negative ACK (NACK) or a request for update of context, the ROHC compressor may transition (e.g., at 940) to state 812. In addition, while in state 814, if the ROHC compressor receives a static NACK, the ROHC compressor may transition (e.g., at 932) back to state 810. Once in state 812, if the ROHC compressor receives an ACK, it may transition (e.g., at 958) back to state 814. Conversely, if the ROHC compressor receives a NACK or a static NACK, it may transition (e.g., at 936) to state 810. Once in state 810, the ROHC compressor may optionally transition back to either state 812 (e.g., at 954) or state 814 (e.g., at 950) upon receiving an ACK from the ROHC decompressor.

Figures 10, 11:
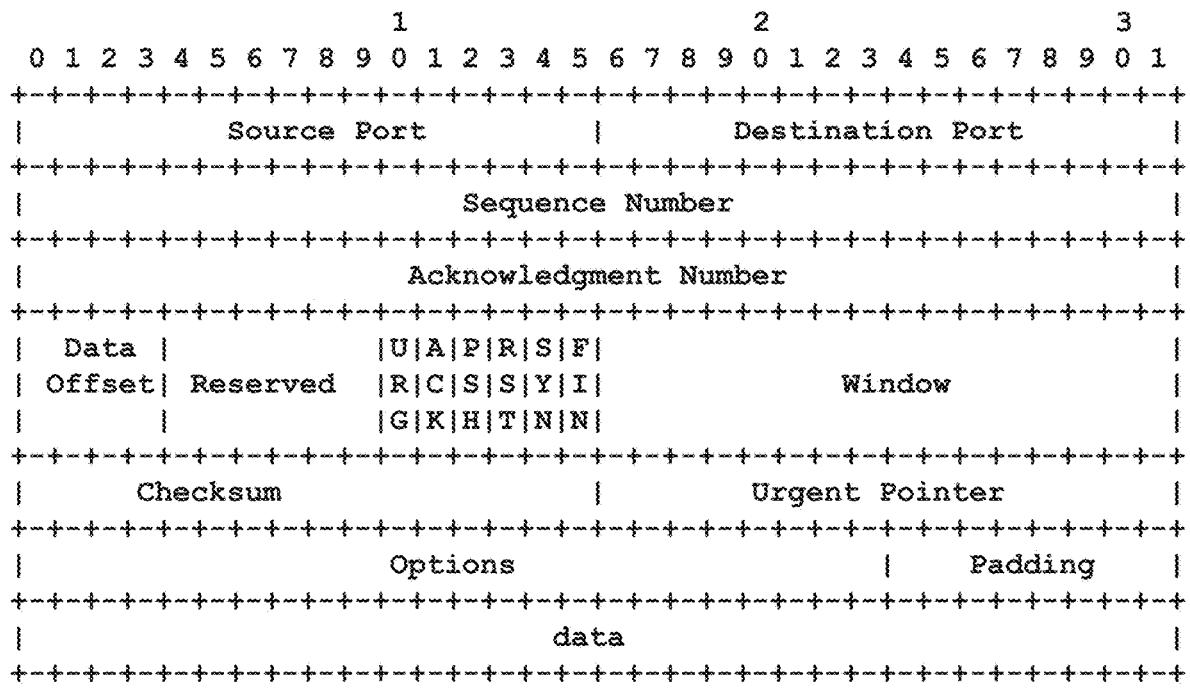
FIG. 10 illustrates TCP header and options available for ROHC compression, according to IETF RFC 6846.
FIG. 11 illustrates a TCP packet format, according to IETF RFC 793.

As noted, the ROHC protocol has been implemented for TCP packet compression. FIGS. 10-13 illustrate various structures and formats of TPC and MPTCP headers. For example, FIG. 10 illustrates a TCP packet format according to IETF RFC 793. Note that, as illustrated, one tick mark may represent one bit position. The TCP packet format includes header fields for Source Port (e.g., 16 bits for a source port number,) Destination Port (e.g., 16 bits for a destination port number), Sequence Number (e.g., 32 bits for a sequence number of a first data octet in a segment), Acknowledgment Number (e.g., 32 bits for a value of a next sequence number a sender of the segment expects to receive), Data Offset (e.g., 4 bits for a number of 32 bit words in the TCP header), Reserved (e.g., 6 bits reserved for future use), Control Bits (e.g., 6 bits for controls, such as URG (urgent point field significant), ACK (acknowledgment field significant), PSH (push function), RST (reset a connection), SYN (synchronize sequence numbers), and FIN (no more data from sender)), Window (e.g., 16 bits for a number of data octets beginning with one indicated in the acknowledgment field which the sender of the segment is willing to accept), Checksum (e.g., 16 bits of one's complement of the one's complement sum of all 16 bit words in the header and text), Urgent Pointer (e.g., 16 bits for communicating a current value of the urgent pointer as a positive offset from the sequence number in the segment), Options (e.g., a variable number of bits in multiples of 8 bits), Padding (e.g., a variable number of bits to ensure TCP header ends and data begins on a 32 bit boundary). As shown, data follows the header.

IETF RFC 6846 specifies various TCP header fields that are available for ROHC compression. For example, as FIG. 11 illustrates, TCP header fields available for compression include IPv4 Identification (IP-ID), TCP Sequence Number (SN), TCP Acknowledgment Number, TCP Reserved, TCP ECN flags (ECN), TCP Window, and TCP Options. As further illustrated by FIG. 11, supported TCP options include Maximum Segment Size (MSS), Window Scale (WSCALE), Selective Acknowledgments (SACK) Permitted, TCP SACK (SACK), and TCP Timestamp (TS).

FIG. 12 illustrates an MPTCP option Format of a TCP header, according to IETF RFC 6824. IETF RFC 6824 defines a multipath TCP (MPTCP) protocol as a set of extensions to regular TCP to provide a multi-path TCP service, which may enable a transport connection to operate across multiple paths simultaneously. For example, MPTCP may extend usage of the TCP options field and all the MPTCP signaling and control information may be transmitted in the TCP options field. In addition, since the Data Offset field is 4 bits (0-15) and a maximum TCP header size is 60 bytes, the options field can occupy at most 20 bytes. For example, as illustrated by FIG. 12, TCP options fields include a Kind field, a length field, a subtype field, and subtype-specific data (at variable lengths). Note that a single TCP option number (e.g., "Kind" field) has been assigned for MPTCP and individual messages may be determined by a value of the subtype field.

FIG. 13 illustrates MPTCP subtypes, according to IETF RRFC 6824. For example, a value of 0x0 is an indication of multipath capability (e.g., as defined in Section 3.1 of IETF RFC 6824), a value of 0x1 is an indication to join a connection (e.g., as defined in Section 3.2 of IETF RFC 6824), a value of 0x2 is a data sequence signal (e.g., as defined in Section 3.3 of IETF RFC 6824), a value of 0x3 is an indication to add an address (e.g., as defined in Section 3.4.1 of IETF RFC 6824), a value of 0x4 is an indication to remove an address (e.g., as defined in Section 3.4.2 of IETF RFC 6824), a value of 0x5 is an indication to change subflow priority (e.g., as defined in Section 3.3.8 of IETF RFC 6824), a value of 0x6 is an indication to fallback (e.g., as defined in Section 3.6 of IETF RFC 6824), a value of 0x7 is an indication for a fast close (e.g., as defined in Section 3.5 of IETF RFC 6824), values 0x8 through 0xe are unassigned, and a value of 0xf is reserved.

As TCP has developed, more options have come into use, e.g., such as the MPTCP option as described above. MPTCP has come into wide usage on mobile devices, however, ROHC compression methods as defined in IETF RFC 6824 do not explicitly allow for MPTCP packets, thus compression of MPTCP packet headers is inefficient. In addition, current methods often result in errors within decompressor state machines when ROHC compression of MPTCP packet headers is attempted, resulting in delays and/or failures in transmission of MPTCP packets.

Thus, embodiments of this disclosure define (specify) a ROHC compression procedure and algorithm dedicated to MPTCP. In some embodiments, as illustrated by state machine 1400 of FIG. 14, three additional modes of ROHC header compression may be enabled for MPTCP a non-compression mode (e.g., state 1410), a safe compression mode (e.g., state 1420), and a full compression mode (e.g., state 1430). In some embodiments, a device, such as UE 106 described above, may start in the non-compression mode 1420 when both a compressor (e.g., comprised within the device) and a decompressor (e.g., comprised within a base station, e.g., such as base station 102 or AP 112) support ROHC-TCP, but the decompressor experiences an error condition attempting to decompress TCP packets with the MPTCP option. In some embodiments, the non-compression mode may be entered in response to the decompressor providing error feedback to the compressor, e.g., when the compression is operating in one of the bi-directional modes of operation. In such instances, the compressor may only compress TCP packets without the MPTCP option to avoid future error feedback.

In some embodiments, the device (e.g., UE 106) may select (or transition into, e.g., at 1401) the safe compression mode (e.g., state 1420). In such embodiments, the device may initially compress TCP packets without the MPTCP option and leave the MPTCP option portion uncompressed. In such embodiments, the device may transmit the MPTCP option in a compressed list. In addition, in some embodiments, the safe compression mode may be initially used during MPTCP initiation (e.g., MPTCP connection establishment). In some embodiments, the same compression mode may be used when an MPTCP address addition is necessary, and/or when an MPTCP address removal is necessary.

In some embodiments, while in the safe compression mode 1420 and after context initiation (e.g., connection establishment) and presentation of the MPTCP option to the decompressor, irregular content (e.g., including the MPTCP option) may be sent (transmitted by the device) as part of an irregular chain if structure and content of the compressed list are unchanged, and the structure and content include the MPTCP option, subtype, and subtype-specific-data. In other words, when the structure and the content of the compressed list are unchanged, no information about the compressed list needs to be sent in compressed base headers and the irregular content may be sent (transmitted) as part of the irregular chain, including the MPTCP option. Note that in some embodiments, MPTCP content may regarded as unchanged only if kind, length, subtype, and subtype-specific-data are all unchanged.

Note additionally, a compressed header chain functions to group fields based on similar characteristics. For example, chaining is formed by appending an item for each heard to a chain in their order of appearance in an uncompressed packet. In some embodiments, for a compressed MPTCP packet, an irregular chain may include irregular chain items for TCP option. Note that these chain items may be placed after irregular chain items of the TCP header.

In some embodiments, while in the safe compression mode 1420 and after context initiation (e.g., connection establishment) and presentation of the MPTCP option to the decompressor, irregular content (e.g., including the MPTCP option) may be sent (transmitted by the device) as part of an irregular chain if the structure of the compressed list is constant and the content defined within the irregular format for options has changed. In other words, when structure of the compressed list is unchanged, but the content defined within the irregular format for options has changed, no information about the compressed list needs to be sent in compressed base headers and the irregular content may be sent (transmitted) as part of the irregular chain, including the MPTCP option. Note that in some embodiments, MPTCP content may be regarded as changed if any byte in length, subtype, and/or subtype-specific-data has changed.

In some embodiments, while in the safe compression mode 1420 and after context initiation (e.g., connection establishment) and presentation of the MPTCP option to the decompressor, a compressed list and irregular content may be sent (transmitted by the device) if the structure of the list changes. In other words, a compressed list may be sent in a compressed base header, including a representation of its structure and order. In addition, content defined within the irregular format of an option may be sent as part of the irregular chain, provided that the item content is not part of the compressed list.

In some embodiments, the device (e.g., UE 106) may select (or transition into, e.g., at 1402) the full compression mode (e.g., state 1430). In such embodiments, the device may compress the entire MPTCP packet, including TCP header, TCP options, and MPTCP option. Note that in some embodiments, full compression mode may be enabled during MPTCP data transmission stage (e.g., after context initiation). In some embodiments, full compression mode may only be enabled for MPTCP subtype 0x02.

In some embodiments, while in the full compression mode 1430 and after context initiation (e.g., connection establishment) and presentation of the MPTCP option to the decompressor (e.g., the compressor has transmitted a complete compressed list of options), no information about the compressed list may be sent (e.g., transmitted by the device) in compressed base headers if structure and content of the compressed list are unchanged. In other words, if the structure and the content of the compressed list are constant, then the compressed list may not be transmitted, e.g., to save transmission overhead.

In some embodiments, while in the full compression mode 1430 and after context initiation (e.g., connection establishment) and presentation of the MPTCP option to the decompressor (e.g., the compressor has transmitted a complete compressed list of options), irregular content (e.g., the MPTCP option) may be sent (transmitted by the device) as part of an irregular chain if the structure of the compressed list is constant and the content defined within the irregular format for options has changed. In other words, when structure of the compressed list is unchanged (e.g., constant), but the content defined within the irregular format for options has changed, no information about the compressed list needs to be sent in compressed base headers and the irregular content may be sent (transmitted) as part of the irregular chain. Note that in some embodiments, MPTCP content may regarded as changed if any byte in length, subtype, and/or subtype-specific-data has changed.

In some embodiments, while in the full compression mode 1430 and after context initiation (e.g., connection establishment) and presentation of the MPTCP option to the decompressor, a compressed list and irregular content may be sent (transmitted by the device) if the structure of the list changes. In other words, a compressed list may be sent in a compressed base header, including a representation of its structure and order. In addition, content defined within the irregular format of an option may be sent as part of the irregular chain, provided that the item content is not part of the compressed list.

Note that in some embodiments, the device (e.g., UE 106) may transition (e.g., at 1401) from the non-compression mode 1410 to the safe compression mode 1420 (and visaversa) based on feedback (positive or negative ACKs) from the decompressor. In addition, the device may transition (e.g., at 1402) from the safe compression mode 1420 to the full compression mode 1430. Note that if an error condition occurs (or persists) while in the safe compression mode 1420, the device may transition (e.g., at 1403) to the non-compression mode 1410.

Figures 14, 15:
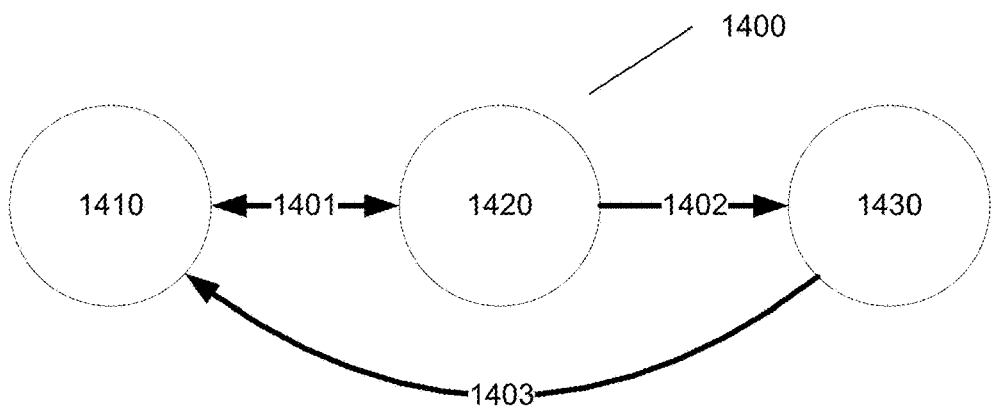
FIG. 14 illustrates an example of a ROHC MPTCP compressor state machine, according to some embodiments.
FIG. 15 illustrates an example of an item-option mapping table, according to some embodiments.

In some embodiments, a device (e.g., UE 106) may implement table-based item compression. For example, as illustrated by FIG. 15, a table may relate an index to an item. In some embodiments, a compressor (included in or implemented by the device) may maintain the table. In addition, a decompressor (included in or implemented on a base station, such as base station 106 or AP 112) may also maintain a table of all (index, item) pairs received. Thus, as illustrated by FIG. 14, an (index, item) pair of (7, MPTCP) may indicate an MPTCP option. In addition, an (index, item) pair of (0, NOP) may indicate a no operation option, an (index, item) pair of (1, EOL) may indicate termination of parsing of options, an (index, item) pair of (2, MSS) may indicate maximum segment size option, an (index, item) pair of (3, Window Scale) may indicate a window scale option, an (index, item) pair of (4, TIMESTAMP) may indicate a timestamp option, an (index, item) pair of (5, SACK-PERMITTED) may indicate a SACK permitted option, an (index, item) pair of (6, SACK) may indicate a SACK option, and indices 8-15 may indicate various generic options.

Figure 16:
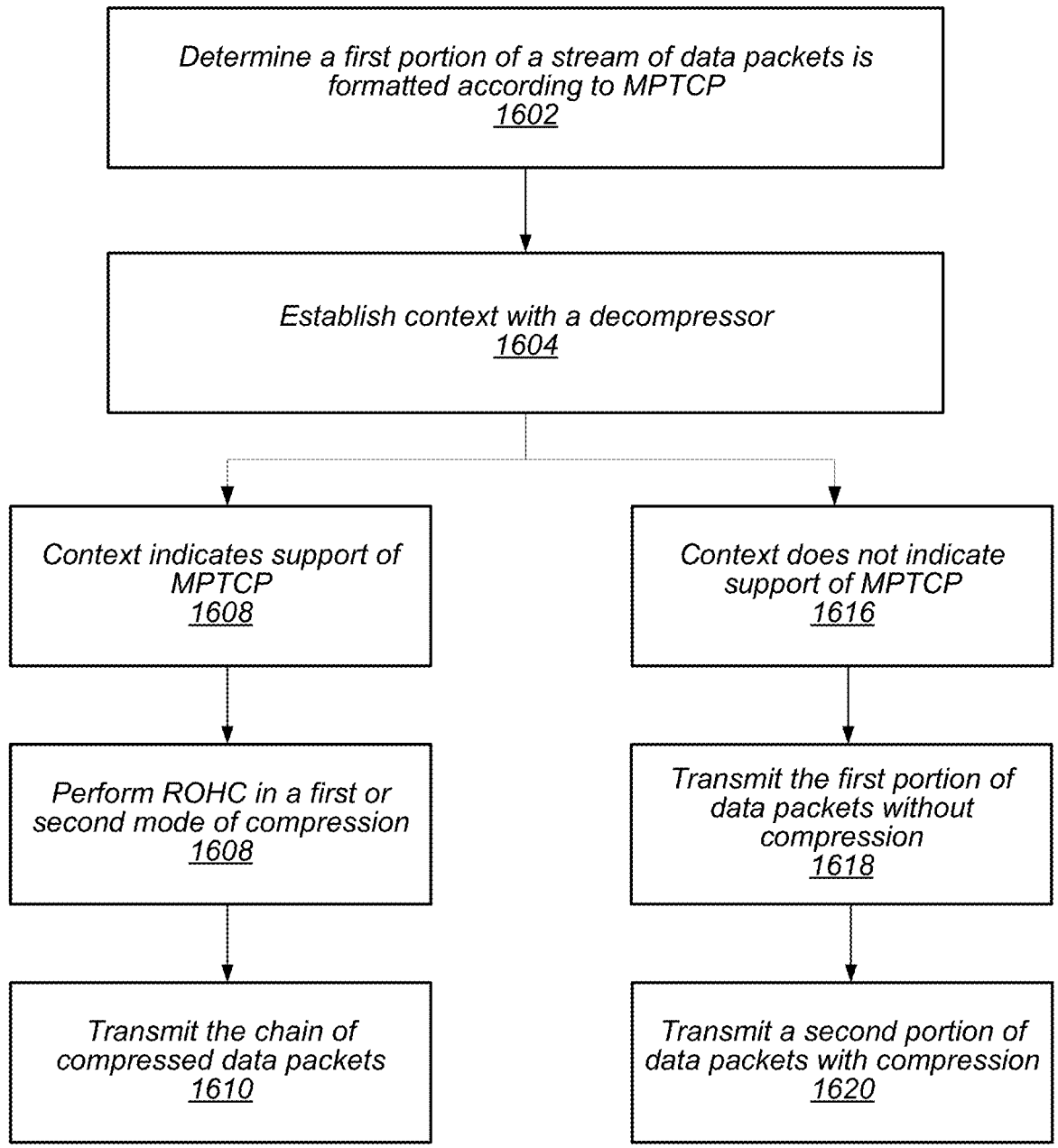
FIG. 16 illustrates a block diagram of an example of a method for ROHC compression of MPTCP packets, according to some embodiments.

FIG. 16 illustrates a block diagram of an example of a method for ROHC compression of MPTCP packets, according to some embodiments. The method shown in FIG. 16 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1602, a compressor (e.g., one or more processors or processing circuitry of a UE, such as UE 106) may determine that a first portion of a stream of data packets is formatted according to a multipath transmission protocol (MPTCP). In other words, the compressor may determine, e.g., based on content of a header of one or more of the data packets, that the data packets are formatted using the transmission control protocol (TCP) and an MPTCP option of the TCP options enabled. For example, first information included in headers of the stream of data may indicate that the first portion of the stream of data packets is formatted according to TCP with the MPTCP option enabled.

At 1604, the compressor may establish context of a data transmission with a corresponding decompressor. Note that the decompressor may be located in (or included in) a base station or access point, e.g., such as base station 106 or AP 112 described above.

At 1606, the context may indicate that the corresponding decompressor supports MPTCP and the method may continue at 1608. In other words, the context may indicate that the corresponding decompressor is configured to decompress data packets that include compressed MPTCP options. Alternatively, at 1616, the context may indicate that the corresponding decompressor does not support MPTCP and the method may continue at 1618. In other words, the context may indicate that the corresponding decompressor is not configured to decompress data packets that included compressed MPTCP options. In some embodiments, the indication may be via feedback received from the corresponding decompressor, e.g., such as an error indication.

At 1608, when the corresponding decompressor supports MPTCP, ROHC may be performed in a first or second mode of compression. The compression may generate a chain of compressed data packets. In some embodiments, a first mode of compression may correspond to transmitting the first portion of the stream of data packets with partial ROHC and transmitting a second portion of the stream of data packets with ROHC. Note that the second portion of the stream of data packets may include data packets in which the MPTCP option is not enabled. In some embodiments, partial ROHC may include performing ROHC on a data packet excluding the MPTCP option and transmitting the MPTCP option as part of a compressed list. In some embodiments, the second mode of compression may correspond to transmitting the first portion of the stream of data packets with ROHC and transmitting the second portion of the stream of data packets with ROHC. In some embodiments, to perform ROHC in the second mode of compression, the compressor may first determine that the first portion of the stream of data packets include an MPTCP subtype (e.g., subtype 0x02) that supports the second mode of compression.

At 1610, the compressor may transmit the chain of compressed data packets.

At 1618, when the corresponding decompressor does not support MPTCP, the compressor may operate in a third mode of compression in which the first portion of the stream of data packets is not compressed and transmit the first portion of the data packets without compression. In addition, at 1620, the compressor may perform ROHC on the second portion of the stream of data packets (e.g., data packets without the MPTCP option enabled) and transmit the second portion as compressed data packets.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna for performing wireless communication;
at least one radio coupled to the at least one antenna, wherein the at least one radio is configured to perform cellular communication with a base station;
one or more processors coupled to the at least one radio, wherein the one or more processors and the at least one radio are configured to perform wireless communications using the at least one antenna;
wherein the one or more processors are configured as a data compressor, wherein the data compressor is configured to:
determine, based on first information comprised in headers of a stream of data packets, that a first portion of the stream of data packets is formatted according to the transmission control protocol (TCP) with a multipath TCP (MPTCP) option enabled;
establish context with a corresponding decompressor, wherein when the context indicates that the corresponding decompressor supports decompression of TCP data packets with MPTCP option enabled, the data compressor is further configured to:
perform RObust Header Compression (ROHC) on the stream of data packets, thereby generating a chain of compressed data packets, wherein, in a first mode of compression, the MPTCP option is not compressed, wherein in a second mode of compression, the MPTCP option is compressed; and
transmit the chain of compressed data packets to the corresponding decompressor.

2. The UE of claim 1,
wherein when the context indicates that the corresponding decompressor does not support ROHC decompression of TCP data packets with the MPTCP option enabled, the data compressor is further configured to:
transmit the first portion of the stream of data packets with the MPTCP option enabled without compression; and
transmit a second portion of the stream of data packets with the MPTCP option not enabled with ROHC.

3. The UE of claim 2,
wherein to establish the context, the data compressor is further configured to:
receive an error indicating that the corresponding decompressor does not support ROHC decompression of TCP data packets with the MPTCP option enabled.

4. The UE of claim 1,
wherein in the first mode of compression, the data compressor is configured to:
transmit the first portion of the stream of data packets with the MPTCP option enabled with partial ROHC; and
transmit a second portion of the stream of data packets with the MPTCP option not enabled with ROHC.

5. The UE of claim 4,
wherein partial ROHC comprises:
performing ROHC on a data packet excluding the MPTCP option; and
transmitting the MPTCP option as part of a compressed list.

6. The UE of claim 1,
wherein in the second mode of compression, the data compressor is configured to:
transmit the first portion of the stream of data packets with the MPTCP option enabled with ROHC; and
transmit a second portion of the stream of data packets with the MPTCP option not enabled with ROHC.

7. The UE of claim 1,
wherein to perform ROHC in the second mode of compression, the data compressor is further configured to:
determine that first portion of the stream of data packets include an MPTCP subtype that supports the second mode of compression.

8. The UE of claim 7,
wherein the MPTCP subtype comprises subtype 0x02.

9. The UE of claim 1,
wherein the data compressor is further configured to:
maintain a table of (index, item) pairs for TCP options included in headers of the data stream, wherein the MPTCP option corresponds to a table index of 7.

10. A compressor, comprising:
a memory; and
a processing element in communication with the memory, wherein the processing element is configured to:
identify, based on first information comprised in headers a stream of data packets, that a first portion of the stream of as data packets is formatted according to the transmission control protocol (TCP) with multipath transmission protocol (MPTCP) option enabled;
compress headers of the stream of data packets based, at least in part, on the data packets being formatted according to the MPTCP protocol, thereby generating a chain of compressed data packets, wherein in a first mode of compression, the MPTCP option is not compressed, and wherein in a second mode of compression, the MPTCP option is compressed; and
generate instructions to transmit, to a corresponding decompressor, the chain of compressed data packets.

11. The compressor of claim 10,
wherein the processing element is further configured to:
receive, from the corresponding decompressor, feedback indicating the corresponding decompressor does not support compression of data packets formatted according the MPTCP protocol; and
generate instructions to transmit the first portion of the stream of data packets with the MPTCP option enabled without compression; and
transmit a second portion of the stream of data packets with the MPTCP option not enabled with compression.

12. The compressor of claim 10,
wherein, prior to generating instructions to transmit the compressed header the processing element is further configured to:
generate instructions to transmit a partially compressed header, wherein the partially compressed header does not included compression of the MPTCP option; and
receive, from the corresponding decompressor, an indication that the corresponding decompressor supports compression of the MPTCP option.

13. The compressor of claim 10,
wherein the data stream comprises MPTCP subtype 0x02 packets.

14. The compressor of claim 10,
wherein the processing element is further configured to:

maintain a table of (index, item) pairs for TCP options included in headers of the data stream.

15. The compressor of claim 14, wherein the MPTCP option corresponds to a table index of 7.

16. A non-transitory computer readable memory medium storing program instructions executable by processing circuitry of a user equipment device (UE) to:
   establish, with a corresponding decompressor, context of a multipath transmission control protocol (MPTCP) RObust Header Compression (ROHC) data transmission;
   generate instructions to transmit the data transmission in an MPTCP ROHC safe compression mode, including compressing data packets of a first format, wherein the first format corresponds to data packets formatted according to the transmission control protocol (TCP) without an MPTCP option enabled; and
   transition the data transmission to an MPTCP ROHC full compression mode, including compressing data packets of the first format.

17. The non-transitory computer readable memory medium of claim 16,
   wherein, to transmit in the MPTCP ROHC safe compression mode, the program instructions are further executable to:
      partially compress data packets of a second format, wherein the second format corresponds to data packets formatted according to TCP with the MPTCP option enabled.

18. The non-transitory computer readable memory medium of claim 16,
   wherein, to transmit in the MPTCP ROHC full compression mode, the program instructions are further executable to:
      compress data packets of a second format, wherein the second format corresponds to data packets formatted according to TCP with the MPTCP option enabled.

19. The non-transitory computer readable memory medium of claim 16,
   where, to transition the data transmission to the MPTCP ROHC full compression mode, the program instructions are further executable to:
      determine that data packets formatted according to the transmission control protocol (TCP) with an MPTCP option enabled are subtype 0x02 MPTCP data packets.

20. The non-transitory computer readable memory medium of claim 16,
   wherein, to establish the context, the program instructions are further executable to:
      receive an error indicating that the corresponding decompressor does not support ROHC decompression of TCP data packets with the MPTCP option enabled.

* * * * *